(12) United States Patent
Tseng

(10) Patent No.: US 11,928,358 B2
(45) Date of Patent: Mar. 12, 2024

(54) COMMAND MANAGEMENT METHOD, MEMORY STORAGE DEVICE AND MEMORY CONTROL CIRCUIT

(71) Applicant: PHISON ELECTRONICS CORP., Miaoli (TW)

(72) Inventor: Ming-Hui Tseng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 108 days.

(21) Appl. No.: 17/672,685

(22) Filed: Feb. 16, 2022

(65) Prior Publication Data

US 2023/0221884 A1 Jul. 13, 2023

(30) Foreign Application Priority Data

Jan. 10, 2022 (TW) ................................. 111100896

(51) Int. Cl.
*G06F 3/06* (2006.01)
(52) U.S. Cl.
CPC .......... *G06F 3/0656* (2013.01); *G06F 3/0604* (2013.01); *G06F 3/0659* (2013.01); *G06F 3/0679* (2013.01)
(58) Field of Classification Search
CPC .... G06F 3/0656; G06F 3/0604; G06F 3/0659; G06F 3/0679
See application file for complete search history.

(56) References Cited

U.S. PATENT DOCUMENTS

2021/0397377 A1* 12/2021 Lee ..................... G06F 11/0751
2022/0357887 A1* 11/2022 Wu ....................... G06F 3/0659

FOREIGN PATENT DOCUMENTS

CN 113903384 1/2022

OTHER PUBLICATIONS

"Office Action of Taiwan Counterpart Application", dated Sep. 15, 2022, p. 1-p. 9.

* cited by examiner

*Primary Examiner* — Edward J Dudek, Jr.
(74) *Attorney, Agent, or Firm* — JCIPRNET

(57) ABSTRACT

A command management method, a memory storage device, and a memory control circuit unit are disclosed. The method includes: obtaining a plurality of commands from a memory of a host system; storing the commands in a first buffer region of the memory storage device; in response to a first command and a second command meeting a pairing condition in the first buffer region, putting the first command and the second command in the first buffer region in a first command queue of the memory storage device; and continuously executing the first command and the second command in the first command queue.

18 Claims, 11 Drawing Sheets

006220004US00
COMMAND MANAGEMENT METHOD, MEMORY STORAGE DEVICE AND MEMORY CONTROL CIRCUIT

CROSS-REFERENCE TO RELATED APPLICATION

This application claims the priority benefit of Taiwan application serial no. 111100896, filed on Jan. 10, 2022. The entirety of the above-mentioned patent application is hereby incorporated by reference herein and made a part of this specification.

BACKGROUND OF THE INVENTION

Technology Field

The invention relates to a memory control technique, and more particularly, to a command management method, a memory storage device, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable electronic devices provided above.

In a host memory buffering (HMB) architecture, the memory storage device may use the memory of the host system as the register of the memory storage device, and may actively access data to the memory of the host system. However, in practice, the buffer space configured to temporarily store commands in a memory storage device is limited. The memory storage device may not be able to store the commands that need to be continuously executed in the limited command buffer space, causing issues in the subsequent operation of the memory storage device.

SUMMARY

In view of this, the invention provides a command management method, a memory storage device, and a memory control circuit unit that may improve the operational stability of the memory storage device.

An exemplary embodiment of the invention provides a command management method configured to a memory storage device. The memory storage device is coupled to a host system. The command management method includes: obtaining a plurality of commands from a memory of the host system; storing the plurality of commands in a first buffer region of the memory storage device; in response to a first command and a second command meeting a pairing condition in the first buffer region, putting the first command and the second command in the first buffer region in a first command queue of the memory storage device; and continuously executing the first command and the second command in the first command queue.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit includes a buffer memory. The memory control circuit unit is configured to: obtain a plurality of commands from a memory of the host system; storing the plurality of commands in a first buffer region of the buffer memory; in response to a first command and a second command meeting a pairing condition in the first buffer region, putting the first command and the second command in the first buffer region in a first command queue of the buffer memory; and continuously executing the first command and the second command in the first command queue.

An exemplary embodiment of the invention further provides a memory control circuit unit including a host interface, a memory interface, a buffer memory, and a memory management circuit. The host interface is configured to be coupled to a host system. The memory interface is configured to be coupled to a rewritable non-volatile memory module. The memory management circuit is coupled to the host interface, the memory interface, and the buffer memory. The memory management circuit is configured to: obtain a plurality of commands from a memory of the host system; storing the plurality of commands in a first buffer region of the buffer memory; in response to a first command and a second command meeting a pairing condition in the first buffer region, putting the first command and the second command in the first buffer region in a first command queue of the buffer memory; and continuously executing the first command and the second command in the first command queue.

Based on the above, after a plurality of commands are obtained from the memory of the host system, the commands may be stored in the first buffer region of the memory storage device. In response to the first command and the second command meeting the pairing condition in the first buffer region, the first command and the second command in the first buffer region may be put in the first command queue of the memory storage device to ensure the first command and the second command meeting the pairing condition may be continuously executed. Thereby, the operational stability of the memory storage device may be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
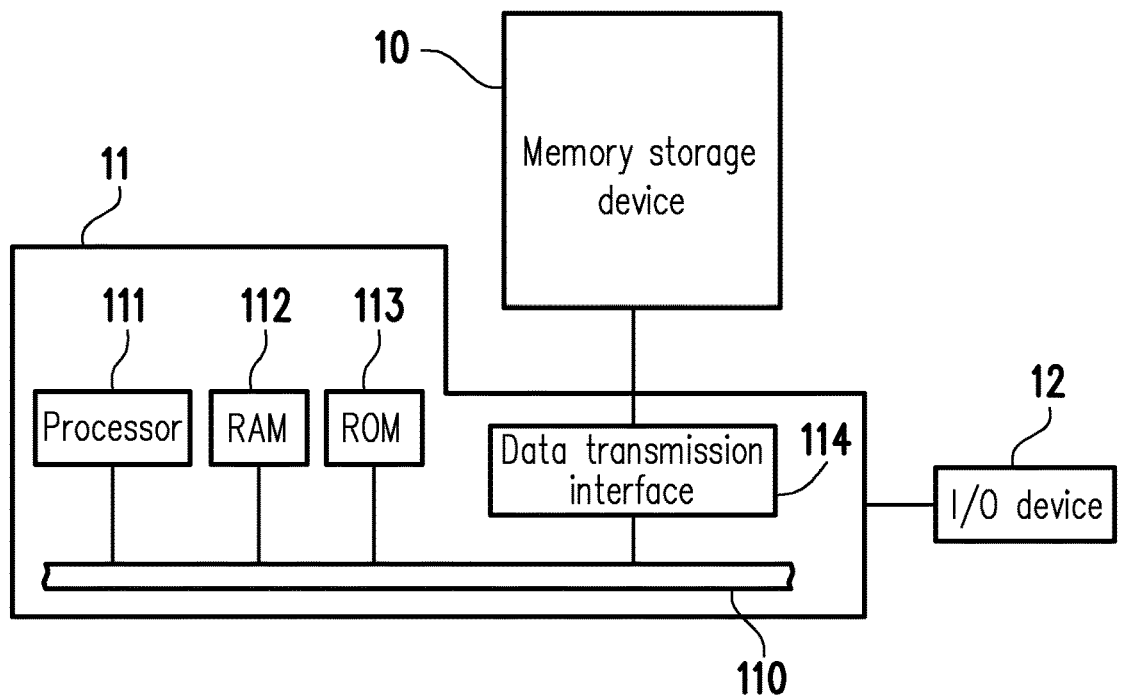
FIG. 1 is a schematic diagram of a host system, a memory storage device, and an input/output (I/O) device shown according to an exemplary embodiment of the invention.
Figure 2:
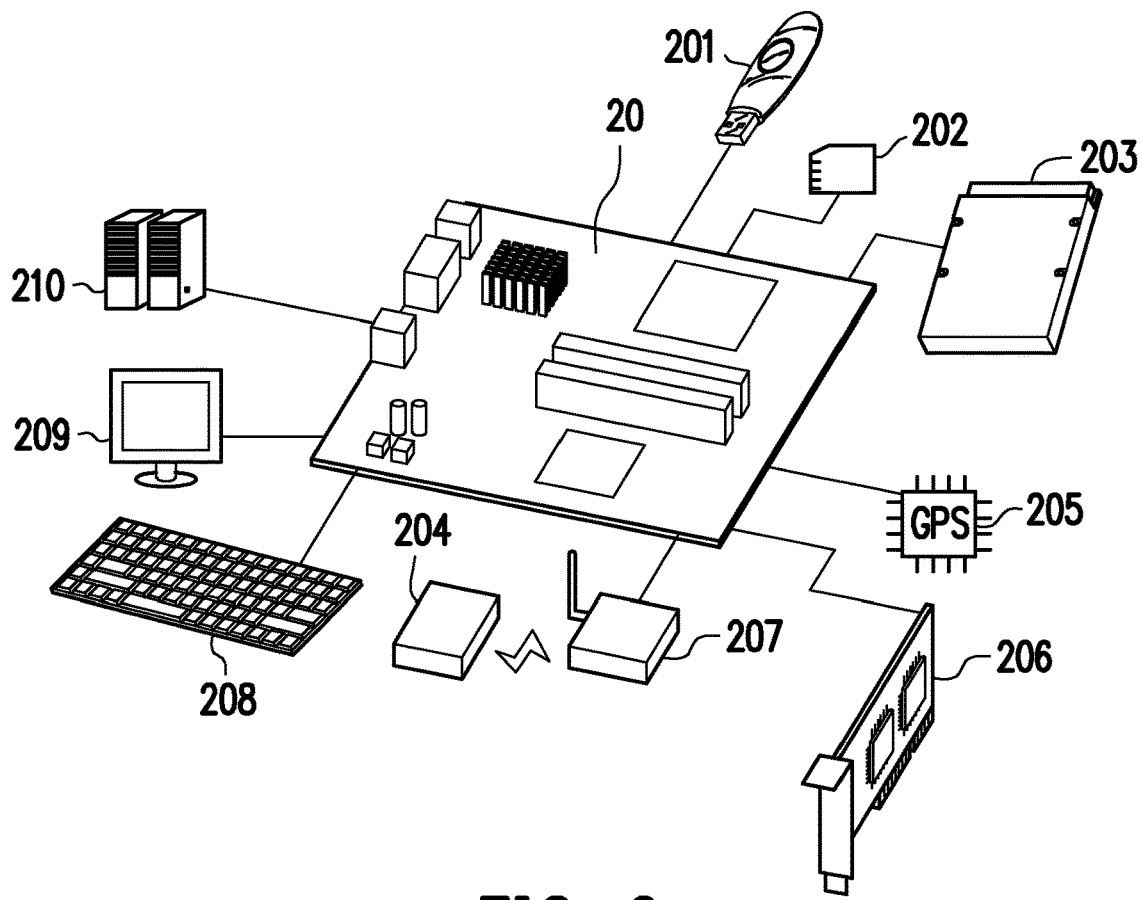
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 via the data transmission interface 114. For example, the host system 11 may store data into the memory storage device 10 or read data from the memory storage device 10 via the data transmission interface 114. Moreover, the host system 11 may be coupled to an I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fidelity (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with a memory storage device. In an exemplary embodiment, the memory storage device 10 and the host system 11 may respectively include a memory storage device 30 and a host system 31 of FIG. 3.

Figure 3:
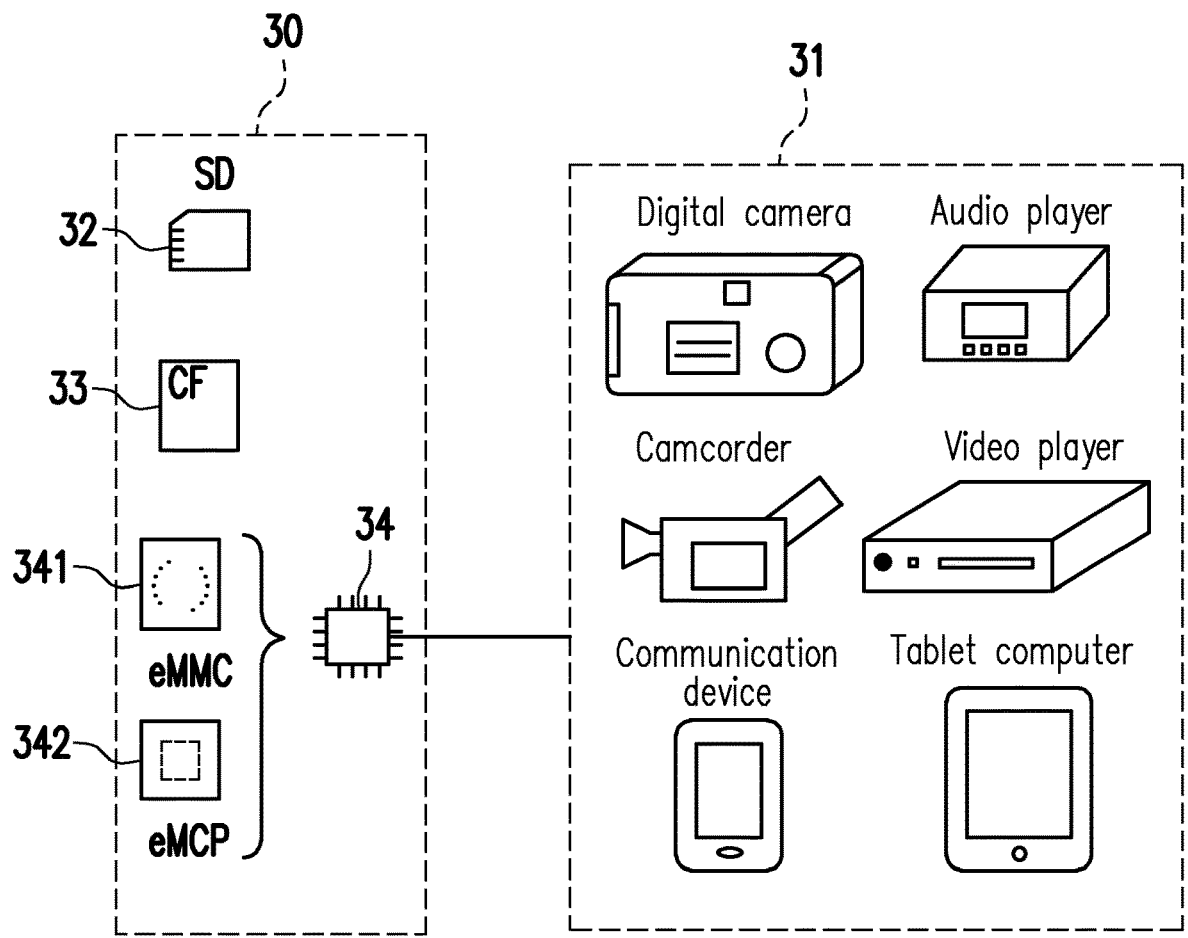
FIG. 3 is a schematic diagram of a host system and a memory storage device shown according to an exemplary embodiment of the invention.

FIG. 3 is a schematic diagram of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a camcorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
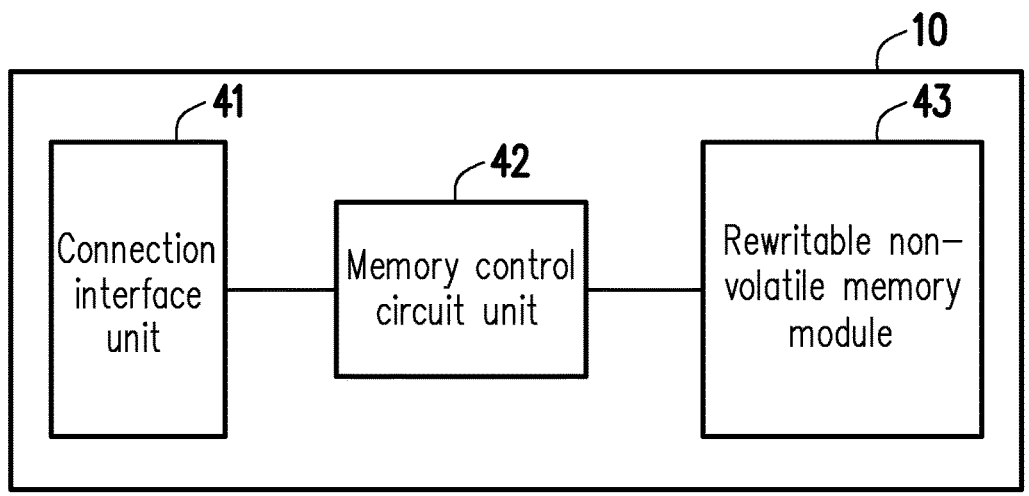
FIG. 4 is a schematic diagram of a memory storage device shown according to an exemplary embodiment of the invention.

FIG. 4 is a schematic diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to execute a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (that is, a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erase units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming units are the smallest units of programming. That is, the physical programming units are the smallest units of data writing. For example, the physical programming units may be physical pages or physical sectors. If the physical programming units are physical pages, then the physical programming units may include a data bit area and a redundant bit area. The data bit area contains a plurality of physical pages configured to store user data, and the redundant bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erase units are the smallest units of erasing. That is, each of the physical erase units contains the smallest number of memory cells erased together. For example, the physical erase units are physical blocks.

Figure 5:
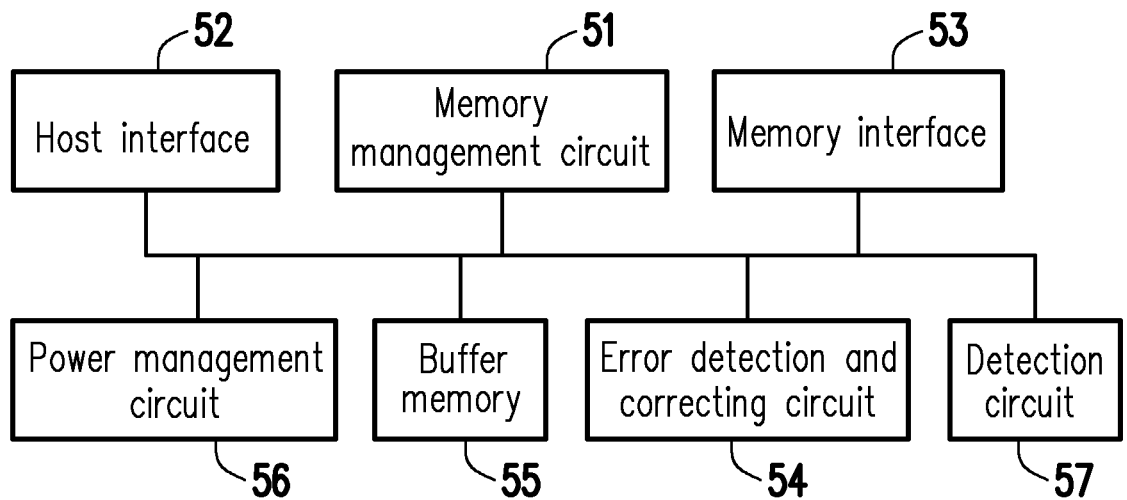
FIG. 5 is a schematic diagram of a memory control circuit unit shown according to an exemplary embodiment of the invention.

FIG. 5 is a schematic diagram of a memory control circuit unit shown according to an exemplary embodiment of the invention. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct the execution of corresponding operations.

The host interface 52 is coupled to the memory management circuit 51. The memory management circuit 51 may communicate with the host system 11 via the host interface 52. The host interface 52 may be configured to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends corresponding command sequences. For example, the command sequences may include a write command sequence instructing data writing, a read command sequence instructing data reading, an erase command sequence instructing data erasing, and corresponding command sequences configured to instruct various memory operations (such as changing read voltage level or executing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when reading command sequences, information such as read identification code or memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 receives a write command from the host system 11, the error detection and correction circuit 54 generates a corresponding error correcting code (ECC) and/or an error detecting code (EDC) for data corresponding to the write command, and the memory management circuit 51 writes the data corresponding to the write command and the corresponding ECC and/or EDC to the rewritable non-volatile memory module 43. Next, when reading data from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the memory control circuit unit 42 further includes a detection circuit 57. The detection circuit 57 is coupled to the memory management circuit 51 and may be configured to analyze the type of at least one command obtained from the host system 11. For example, the detection circuit 57 may include a hardware circuit such as a microprocessor or a microcontroller independent of the memory management circuit 51. In an exemplary embodiment, the detection circuit 57 may also be implemented as a hardware circuit inside the memory management circuit 51, or run by the memory management circuit 51 in the form of software or firmware.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
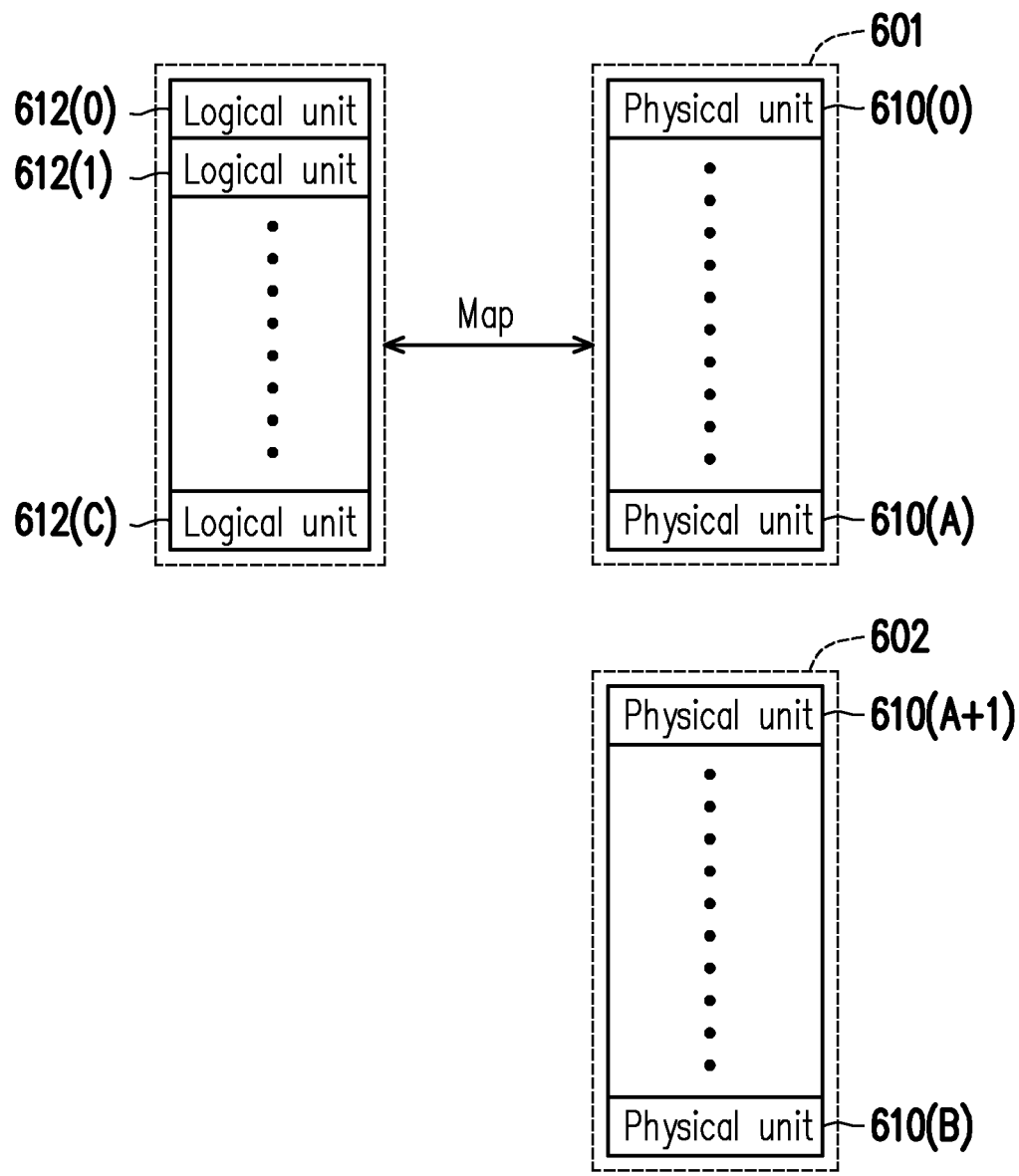
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. Referring to FIG. 6, the memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also be formed by a plurality of continuous or discontinuous physical addresses. In an exemplary embodiment, one physical unit may also refer to one virtual block (VB). One virtual block may include a plurality of physical addresses or a plurality of physical programming units.

The physical units 610(0) to 610(A) in the storage area 601 are configured to store user data (for example, user data from the host system 11 in FIG. 1). For example, the physical units 610(0) to 610(A) in the storage area 601 may store valid data and invalid data. Physical units 610(A+1) to 610(B) in the spare area 602 do not store data (for example, valid data). For example, if a certain physical unit does not store valid data, this physical unit may be associated (or added) to the spare area 602. In addition, the physical units in the spare area 602 (or physical units that do not store valid data) may be erased. When writing new data, one or a plurality of physical units may be extracted from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each of the logical units corresponds to one logical address. For example, one logical address may include one or a plurality of logical block addresses (LBAs) or other logical management units. In an exemplary embodiment, one logical unit may also correspond to one logic programming unit or formed by a plurality of continuous or discontinuous logical addresses.

It should be mentioned that, one logical unit may be mapped to one or a plurality of physical units. If a certain physical unit is currently mapped by a certain logical unit, the data currently stored in this physical unit include valid data. On the other hand, if a certain physical unit is not currently mapped by any logical unit, the data currently stored in this physical unit is invalid data.

The memory management circuit 51 may record the management data describing the mapping relationship between logical units and physical units (also referred to as logical-to-physical mapping information) in at least one logical-to-physical mapping table. When the host system 11 is to read data from the memory storage device 10 or write data to the memory storage device 10, the memory management circuit 51 may access the rewritable non-volatile memory module 43 according to the information in the logical-to-physical mapping table.

Figure 7:
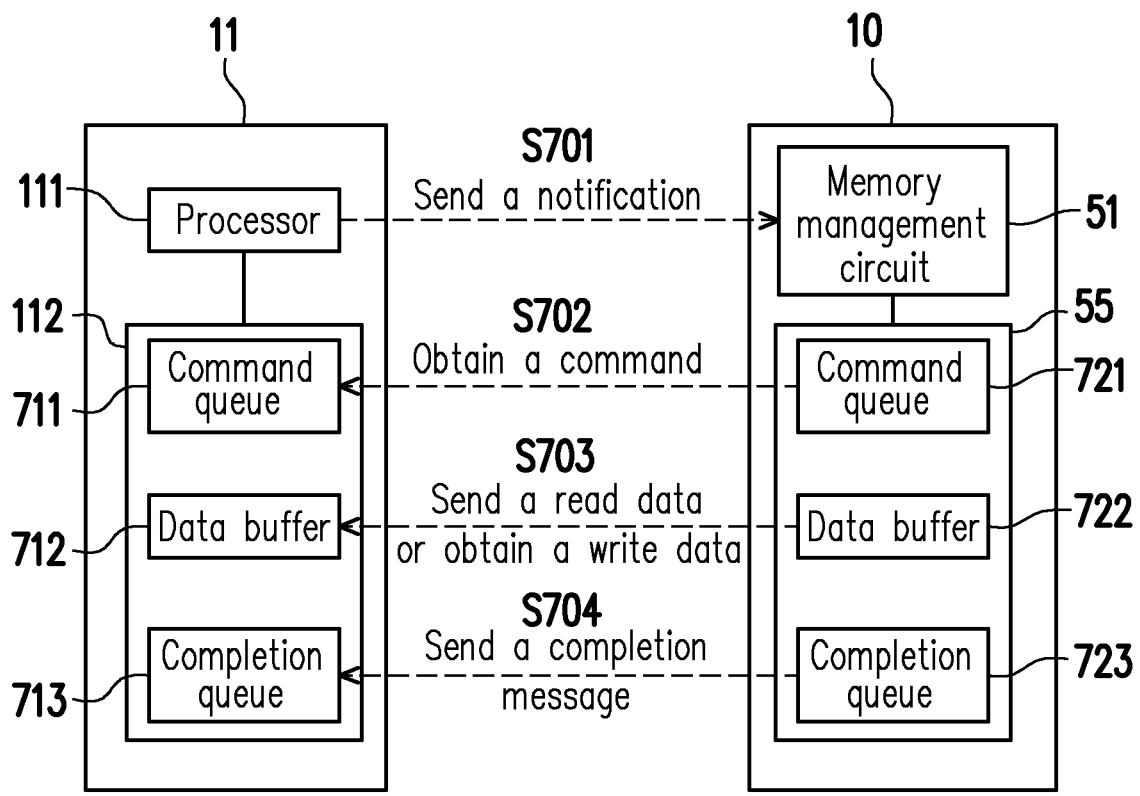
FIG. 7 is a schematic diagram of a host system and a memory storage device shown according to an exemplary embodiment of the invention.

FIG. 7 is a schematic diagram of a host system and a memory storage device shown according to an exemplary embodiment of the invention. Please refer to FIG. 7, both the host system 11 and the memory storage device 10 support host memory buffering (HMB) techniques. Under a host memory buffer architecture, the host system 11 may provide the memory 112 inside the host system 11 to the memory storage device 10 for use. It should be noted that the invention does not limit the total number, capacity, and type of the memory in the memory 112.

The memory management circuit 51 may establish a connection between the memory storage device 10 and the host system 11. For example, the memory management circuit 51 may execute one handshake operation with the host system 11 to establish the connection. After the connection is established, the memory management circuit 51 may access the memory 112 via the connection (for example, store data in the memory 112 or read data from the memory 112) and communicate with the host system 11. In an exemplary embodiment, the connection between the memory storage device 10 and the host system 11 complies with the high-speed non-volatile memory (NVM Express, NVMe) specification.

The memory management circuit 51 may receive one request from the host system 11. This request is configured to inquire whether the memory storage device 10 supports HMB. The memory management circuit 51 may provide one response to the host system 11 according to the request. This response may inform the host system 11 whether the memory storage device 10 supports HMB.

If the memory storage device 10 supports HMB, the host system 11 may enable the memory 112 for the memory storage device 10 to access according to the response. If the memory storage device 10 does not support HMB, the host system 11 may not enable the memory 112. In an exemplary embodiment, if the memory storage device 10 supports HMB, the response may also inform the host system 11 of the memory space and the like needed to execute HMB and other parameters related to HMB. The host system 11 may configure the memory 112 according to the response.

When the host system 11 is to execute an access operation on the memory storage device 10 (for example, read data from the memory storage device 10 or write data to the memory storage device 10), the processor 111 (for example, CPU) of the host system 11 may execute one or a plurality of processing procedures to generate one or a plurality of commands (also referred to as operation commands) to be provided to the memory storage device. The processor 111 may put the prepared command in a command queue 711. The total number of the command queue 711 may be one or a plurality. Then, the processor 111 may send a notification to the memory storage device 10 (step S701). In an exemplary embodiment, the operation of step S701 is also referred to as a ring. In an exemplary embodiment, under the NVM express interface standard, the active behavior of the host system 11 for the memory storage device 10 ends right after the notification is issued.

The memory management circuit 51 may receive the notification and actively read one or a plurality of commands corresponding to the notification from the command queue 711 (step S702). For example, the obtained command may be cached in a command queue 721 in the memory storage device 10. According to the command in the command queue 721, the memory management circuit 51 may execute a corresponding access operation. For example, according to one read command, the memory management circuit 51 may execute one data read operation on the rewritable non-volatile memory module 43 and send the obtained read data from a data buffer 722 to the host system 11 (step S703). For example, the read data may be stored in the data buffer 712 of the host system 11. Or, according to one write command, the memory management circuit 51 may actively read write data from the data buffer 712 of the host system 11 and cache the write data in the data buffer 722 in the memory storage device 10 (step S703). Then, the memory management circuit 51 may execute one data write operation on the rewritable non-volatile memory module 43 to write the write data cached in the data buffer 722 to the rewritable non-volatile memory module 43.

Corresponding to the completion of one access operation, the memory management circuit 51 may generate one completion message, and the completion message may be cached in a completion queue 723 in the memory storage device 10. The completion message is configured to notify the host system 11 that the access operation corresponding to a certain command is completed. Then, the completion message may be sent to the host system 11 and cached in a completion queue 713 of the host system 11 (step S704). According to the data in the completion queue 713, the host system 11 may learn that the memory access operation corresponding to the specific operation command is completed.

It should be mentioned that, in the exemplary embodiment of FIG. 7, the command queue 711, the data buffer 712, and the completion queue 713 are located in the memory 112 of the host system 11, and the command queue 721, the data buffer 722, and the completion queue 723 are located in the buffer memory 55 of the memory storage device 10. However, in another exemplary embodiment, any one of the command queue 711, the data buffer 712, and the completion queue 713 may also be located in other storage media of the host system 11, and/or any of the command queue 721, the data buffer 722, and the completion queue 723 may also be located in other storage media of the memory storage device 10 (for example, the rewritable non-volatile memory module 43).

Figure 8:
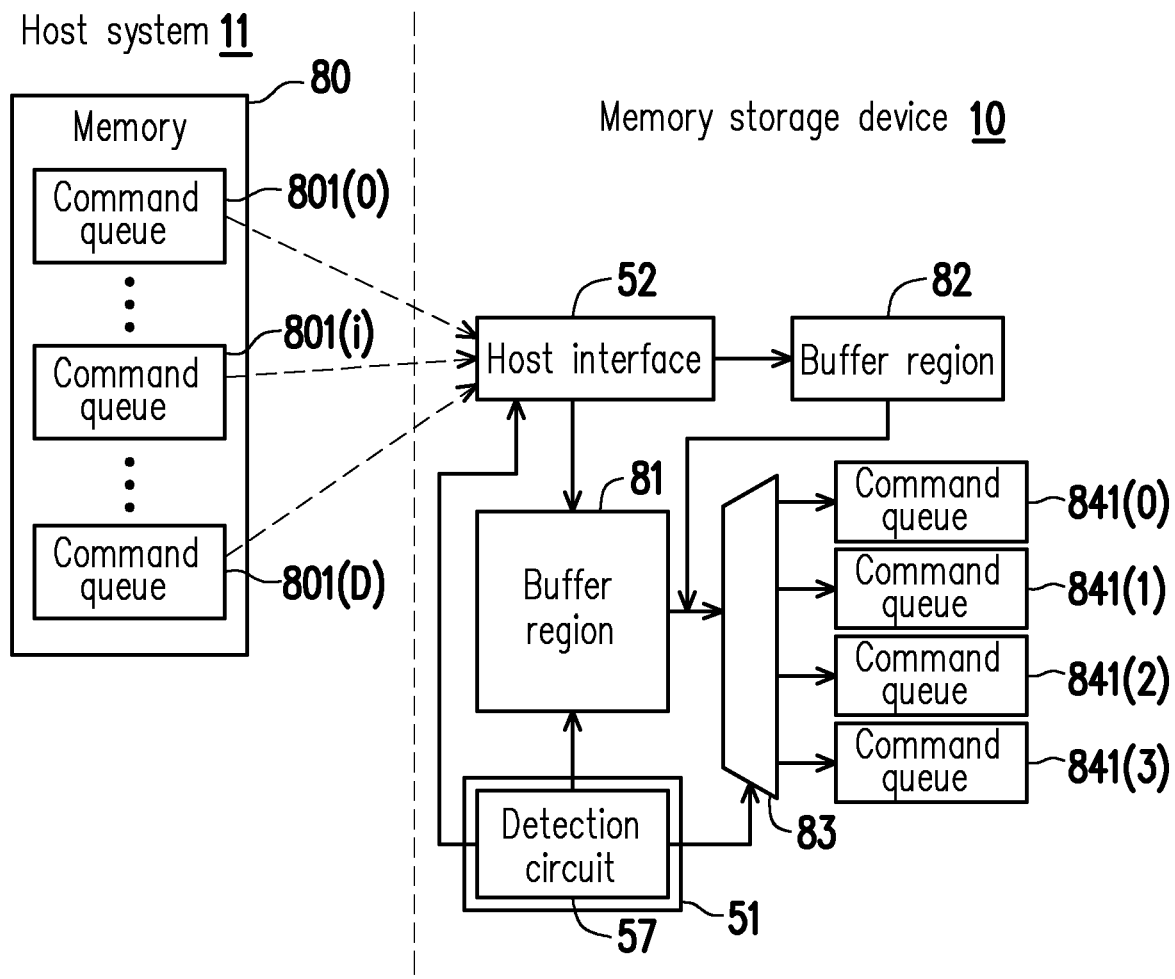
FIG. 8 is a schematic diagram of a host system and a memory storage device shown according to an exemplary embodiment of the invention.

FIG. 8 is a schematic diagram of a host system and a memory storage device shown according to an exemplary embodiment of the invention. Referring to FIG. 8, in an exemplary embodiment, the host system 11 may include a memory 80. For example, memory 80 may include the memory 112 of FIG. 7. The host system 11 may configure command queues 801(0) to 801(D) in the memory 80. For example, the command queues 801(0) to 801(D) may include the command queue 711 of FIG. 7.

In an exemplary embodiment, the memory management circuit 51 may configure a buffer region (also referred to as first buffer region) 81, a buffer region (also referred to as second buffer region) 82, a multiplexer 83, and command queues 841(0) to 841(3) in the memory storage device 10. For example, the buffer region 81, the buffer region 82, and the command queues 841(0) to 841(3) may be configured in the buffer memory 55 of FIG. 7. The multiplexer 83 may be disposed in the memory control circuit unit 42 of FIG. 4 in the form of hardware, software, or firmware. In addition, the total number of the command queues 841(0) to 841(3) may be more or less, and the invention is not limited in this regard.

In an exemplary embodiment, the memory management circuit 51 may obtain a plurality of commands from the memory 80 of the host system 11 via the host interface 52. For example, at least one of the plurality of commands may be obtained from a command queue 801(i). The memory management circuit 51 may store the obtained command in the buffer region 81. According to the type of a certain command (also referred to as target command) in the buffer region 81, the multiplexer 83 may send the target command in the buffer region 81 to one of the command queues 841(0) to 841(3) (that is, the target command queue) to wait in the target command queue to be executed by the memory management circuit 51.

In an exemplary embodiment, the memory management circuit 51 may continuously put the commands in the buffer region 81 meeting the pairing condition in the command queue 841(3). The command queue 841(3) is also referred to as the first command queue. For example, the commands meeting the pairing condition may be grouped in pairs, one of which is referred to as the first command and the other one is referred to as the second command. The first command and the second command are paired with each other. In an exemplary embodiment, the commands meeting the pairing condition (that is, the first command and the second command paired with each other) are specified as needing to be continuously executed. Moreover, in an exemplary embodiment, commands meeting the same pairing condition may also include more commands, for example, three commands, and the three commands paired with one another are specified as needing to be continuously executed.

In an exemplary embodiment, the detection circuit 57 may scan a plurality of commands in the buffer region 81 to identify the commands in the buffer region 81 meeting the pairing condition (for example, the first command and/or the second command). Then, the detection circuit 57 may control the multiplexer 83 to put a plurality of commands paired with each other (for example, the first command and the second command) in the command queue 841(3) continuously. Thereafter, the memory management circuit 51 may continuously execute the commands in the command queue 841(3) meeting the pairing condition (that is, the first command and the second command) and execute operations corresponding to the commands.

Figure 9:
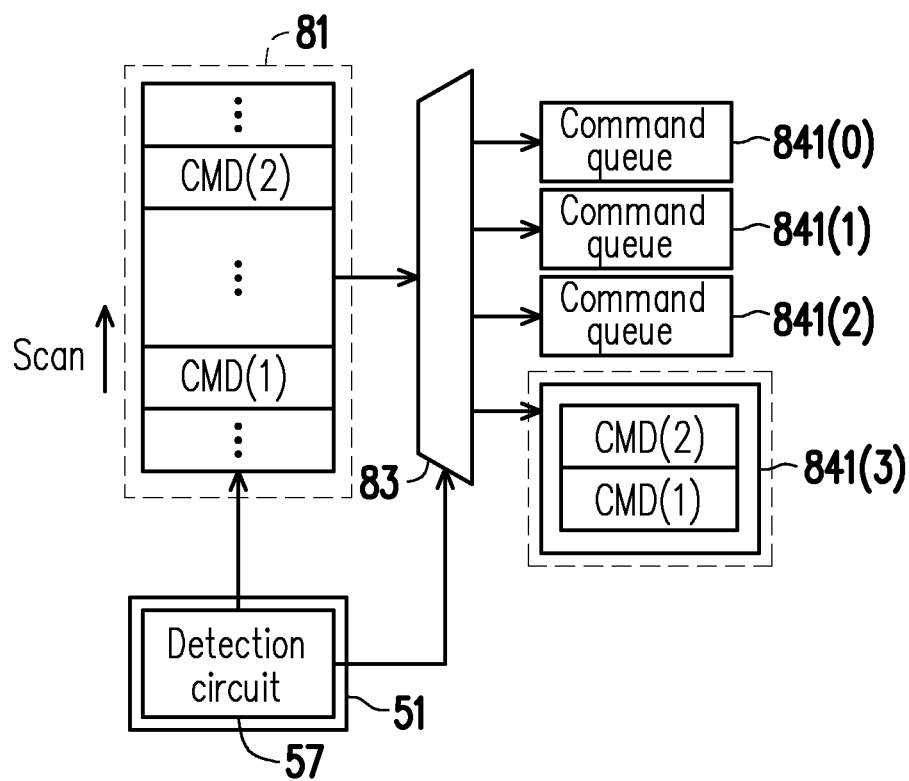
FIG. 9 is a schematic diagram of continuously putting a first command and a second command in a first command queue shown according to an exemplary embodiment of the invention.

FIG. 9 is a schematic diagram of continuously putting a first command and a second command in a first command queue shown according to an exemplary embodiment of the invention. Referring to FIG. 9, in an exemplary embodiment, it is assumed commands CMD(1) (that is, the first command) and CMD(2) (that is, the second command) exist in the buffer region 81 at the same time. The commands CMD(1) and CMD(2) meet the pairing condition. That is, the commands CMD(1) and CMD(2) belong to commands that are specified as needing to be continuously executed. In an exemplary embodiment, the commands CMD(1) and CMD(2) are not continuously executed (for example, a certain command is interspersed and executed between the commands CMD(1) and CMD(2)), and therefore the memory storage device 10 may execute unexpected behavior or error.

In an exemplary embodiment, the detection circuit 57 may scan the buffer region 81. After detecting the command CMD(1), the detection circuit 57 may search for the command CMD(2) meeting the same pairing condition from the remaining commands in the buffer region 81. In response to the commands CMD(1) and CMD(2) in the buffer region 81, the detection circuit 57 may control the multiplexer 83 to continuously put the commands CMD(1) and CMD(2) in the buffer region 81 in the command queue 841(3). Thereafter, the memory management circuit 51 may continuously execute the commands CMD(1) and CMD(2) in the command queue 841(3). This ensures that the commands CMD(1) and CMD(2) are continuously executed.

Returning to FIG. 8, in an exemplary embodiment, in response to the existence of the first command and the absence of the second command in the buffer region 81 (that is, only a portion of the commands meeting the pairing condition exist in the buffer region 81), the memory management circuit 51 may obtain the second command from the memory 80 of the host system 11. For example, it is assumed that the first command is obtained from the command queue 801(i) in the memory 80, the memory management circuit 51 may force read the next command from the same command queue 801(i) to obtain the second command. The memory management circuit 51 may store the force-read second command in the buffer region 82. Then, the memory management circuit 51 may continuously put the first command in the buffer region 81 and the second command in the buffer region 82 in the command queue 841(3).

Figure 10:
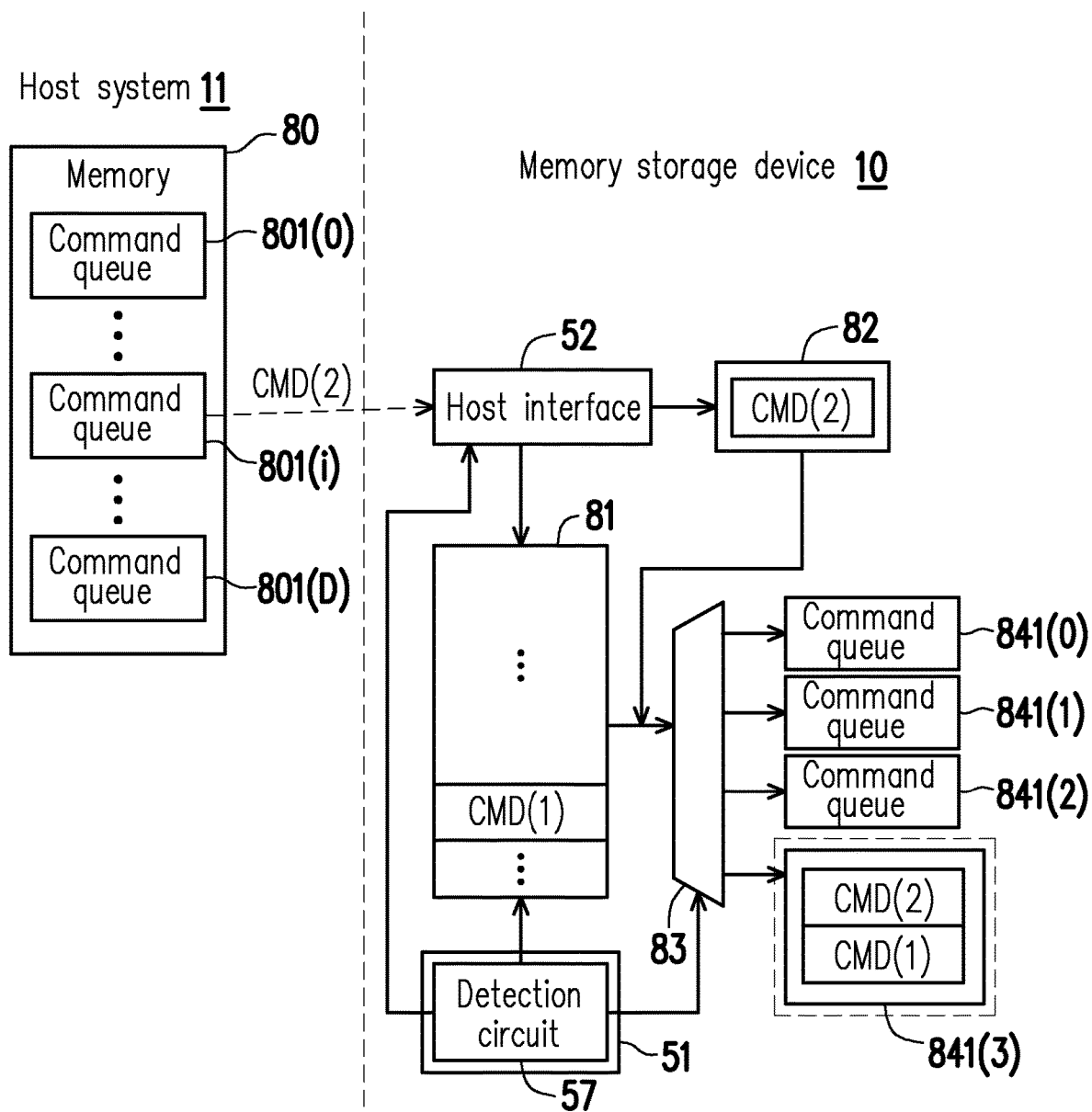
FIG. 10 is a schematic diagram of continuously putting a first command and a second command in a first command queue shown according to an exemplary embodiment of the invention.

FIG. 10 is a schematic diagram of continuously putting a first command and a second command in a first command queue shown according to an exemplary embodiment of the invention. Referring to FIG. 10, it is assumed that the detection circuit 57 detects that the command CMD(1) exists in the buffer region 81 but lacks the command CMD(2) meeting the same pairing condition. In response to the command CMD(1) being from the command queue 801(i) in the host system 11, the detection circuit 57 may force read the next command from the command queue 801(i) via the host interface 52 to obtain the command CMD(2). The command CMD(2) may be stored in the buffer region 82.

Then, the detection circuit 57 may control the multiplexer 83 to continuously put the command CMD(1) in the buffer region 81 and the command CMD(2) in the buffer region 82 in the command queue 841(3). In this way, the commands CMD(1) and CMD(2) in the command queue 841(3) may also be ensured to be continuously executed.

Returning to FIG. 8, in an exemplary embodiment, the memory management circuit 51 may put the command (also referred to as third command) not meeting the pairing condition in the buffer region 81 in one of the command queues 841(0) to 841(2). The command queues 841(0) to 841(2) are also referred to as the second command queue. Thereafter, the memory management circuit 51 may execute the command (that is, the third command) in the command queues 841(0) to 841(2).

Figure 11:
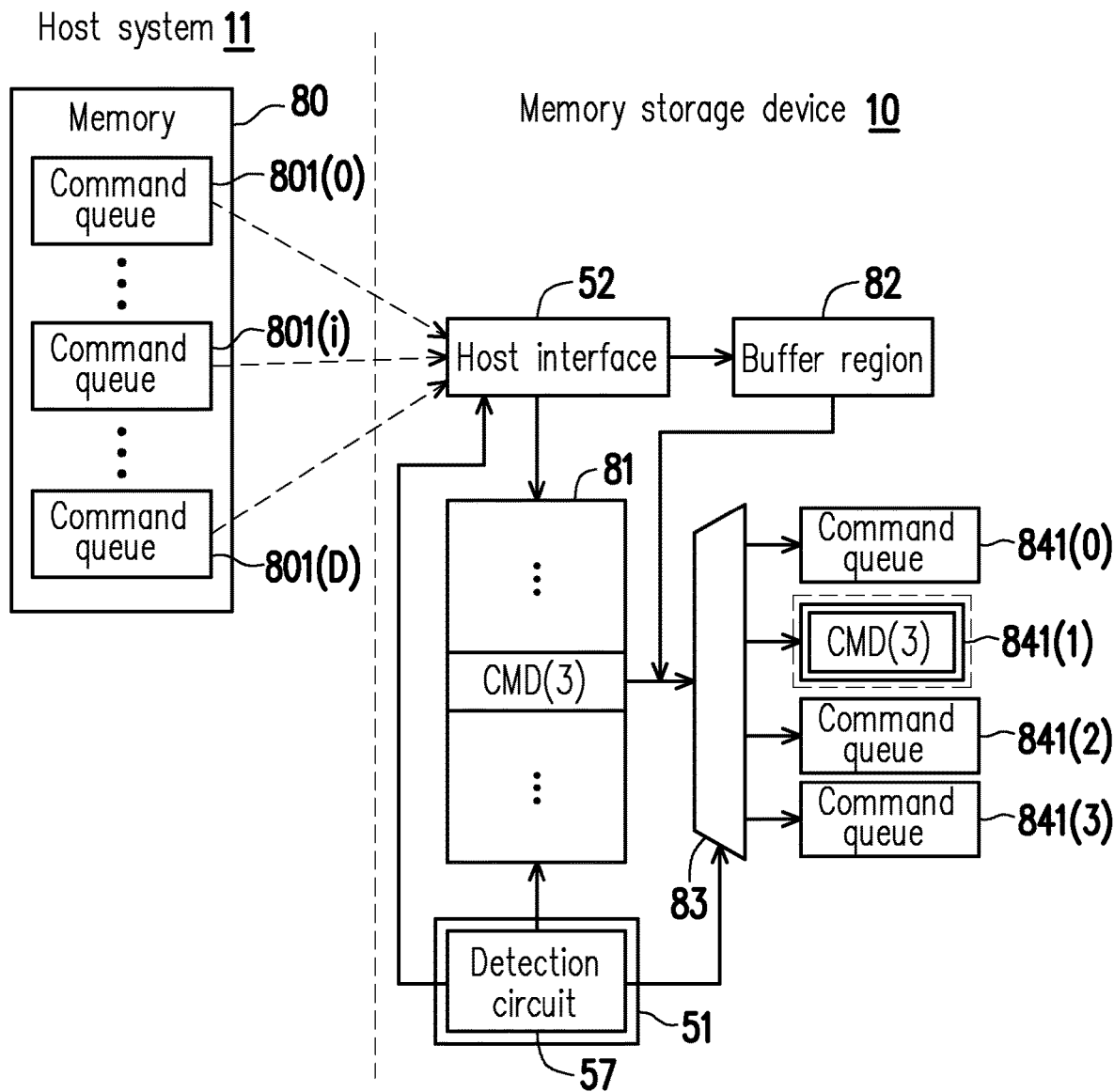
FIG. 11 is a schematic diagram of putting a third command in a second command queue shown according to an exemplary embodiment of the invention.

FIG. 11 is a schematic diagram of putting a third command in a second command queue shown according to an exemplary embodiment of the invention. Referring to FIG. 11, for the command CMD(3) (that is, the third command) not meeting the pairing condition in the buffer region 81, the detection circuit 57 may control the multiplexer 83 to put the command CMD(3) in one of the command queues 841(0) to 841(2), such as the command queue 841(1), to wait for execution.

In an exemplary embodiment, the first command queue (for example, the command queue 841(3) of FIG. 8 to FIG. 11) is dedicated to storing commands meeting the pairing condition (for example, the first command and the second command). Moreover, the second command queue (for example, the command queues 841(0) to 841(2) of FIG. 8 to FIG. 11) is dedicated to storing commands not meeting the pairing condition (for example, the third command).

In an exemplary embodiment, the command queues 841(0) to 841(2) may also be configured to store different types of commands. For example, the command queue 841(0) may be dedicated to store a write command, the command queue 841(2) may be dedicated to store a read command, and/or the command queue 841(3) may be dedicated to store an erase command. In an exemplary embodiment, the total number of the command queues 841(0) to 841(2) may also be larger to store more types of commands.

In an exemplary embodiment, the commands meeting the pairing condition (that is, the first command and the second command) need to be continuously executed. That is, during the execution of the first command and the second command, no other command may be executed. Moreover, in response to the failed execution of one of the plurality of commands meeting the pairing condition (that is, the first command), another one of the plurality of commands (that is, the second command) meeting the pairing condition is aborted (that is, not executed).

In an exemplary embodiment, the commands meeting the pairing condition (that is, the first command and the second command) may include a fused operation (FUSE) command. The FUSE command may include a compare command and a write command. In particular, in the FUSE command, the write command needs to be executed after the compare command. For example, according to the compare command in the FUSE command, the memory management circuit 51 may determine whether specific data exists in the rewritable non-volatile memory module 43. This specific data may be stored in a specific logical unit. If the specific data exists, the memory management circuit 51 may then execute the write command in the FUSE command. According to the write command, the memory management circuit 51 may update the specific data. However, if the specific data does not exist, the memory management circuit 51 may not execute the write command.

Via the above mechanism, regardless of whether there are currently commands meeting the pairing condition in the buffer region 81 at the same time, the commands meeting the pairing condition may all be continuously put in the same command queue to wait for continuous execution. In this way, the probability that the memory storage device 10 does not continuously execute the specific command and causing unexpected behavior or error may be reduced.

Figure 12:
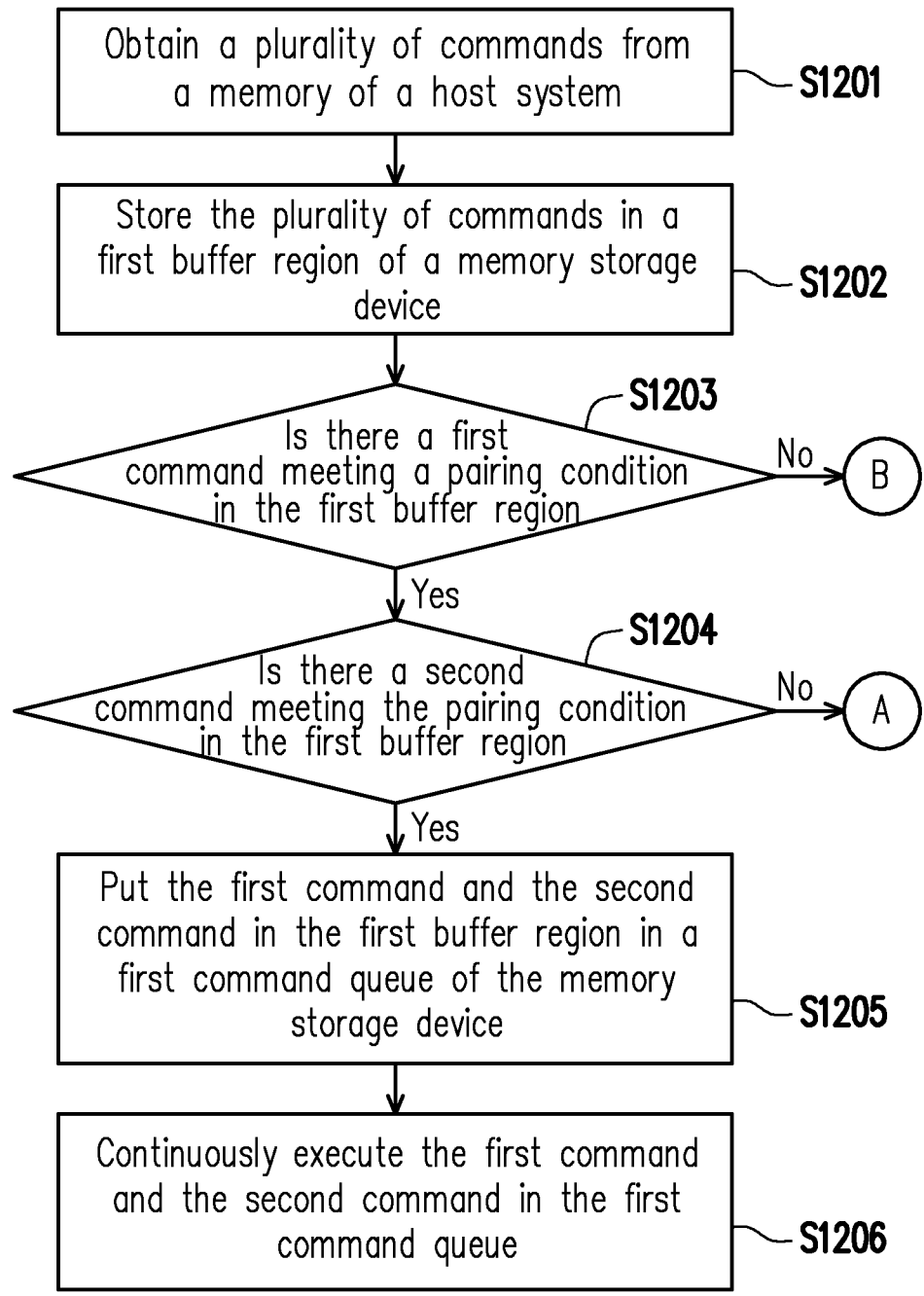
FIG. 12 is a flowchart of a command management method shown according to an exemplary embodiment of the invention.

FIG. 12 is a flowchart of a command management method shown according to an exemplary embodiment of the invention. Referring to FIG. 12, in step S1201, a plurality of commands are obtained from a memory of a host system. In step S1202, the plurality of commands are stored in a first buffer region of a memory storage device. In step S1203, whether there is a first command meeting a pairing condition in the first buffer region is determined. If there is a first command meeting the pairing condition in the first buffer region, in step S1204, whether there is a second command meeting the pairing condition in the first buffer region is determined. If both the first command and the second command meeting the pairing condition exist in the first buffer region at the same time, in step S1205, in response to the first command and the second command in the first buffer region meeting the pairing condition, the first command and the second command in the first buffer region are put in a first command queue of the memory storage device. In step S1206, the first command and the second command in the first command queue are continuously executed.

Figure 13:
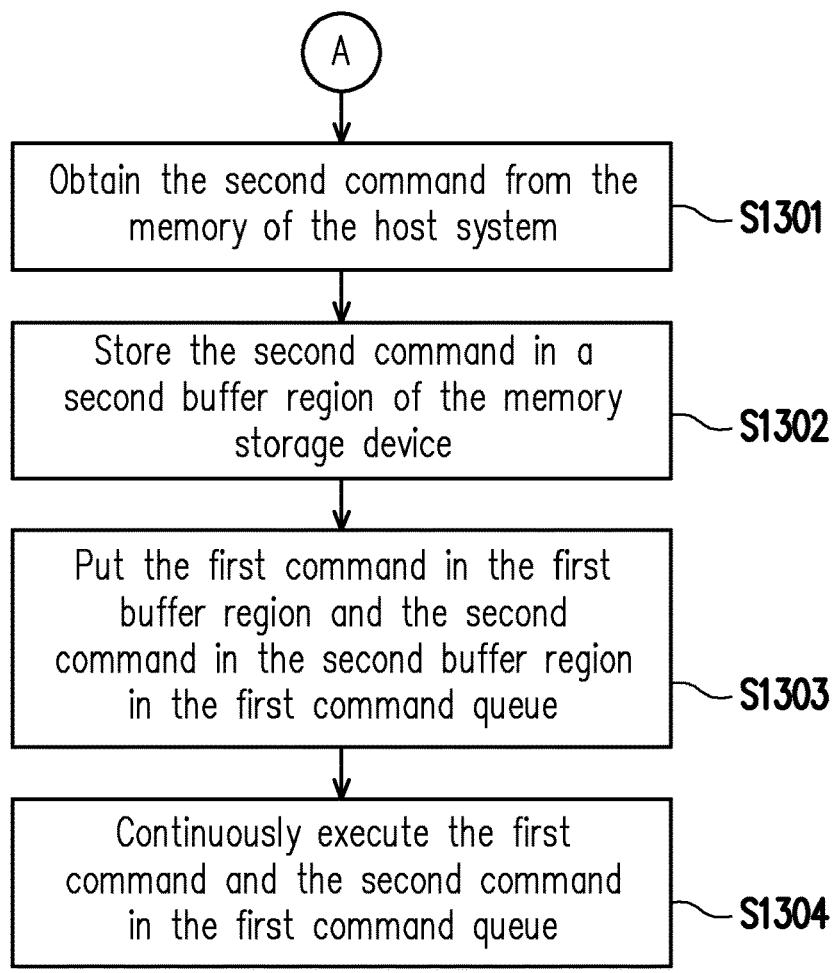
FIG. 13 is a flowchart of a command management method shown according to an exemplary embodiment of the invention.

FIG. 13 is a flowchart of a command management method shown according to an exemplary embodiment of the invention. Referring to FIG. 13, continuing from the exemplary embodiment of FIG. 12, if the determination of step S1204 is no (that is, there is a first command meeting the pairing condition in the first buffer region but the second command does not exist), in step S1301, the second command is obtained from the memory of the host system. In step S1302, the second command is stored in a second buffer region of the memory storage device. In step S1303, the first command in the first buffer region and the second command in the second buffer region are put in the first command queue. In step S1304, the first command and the second command in the first command queue are continuously executed.

Figure 14:
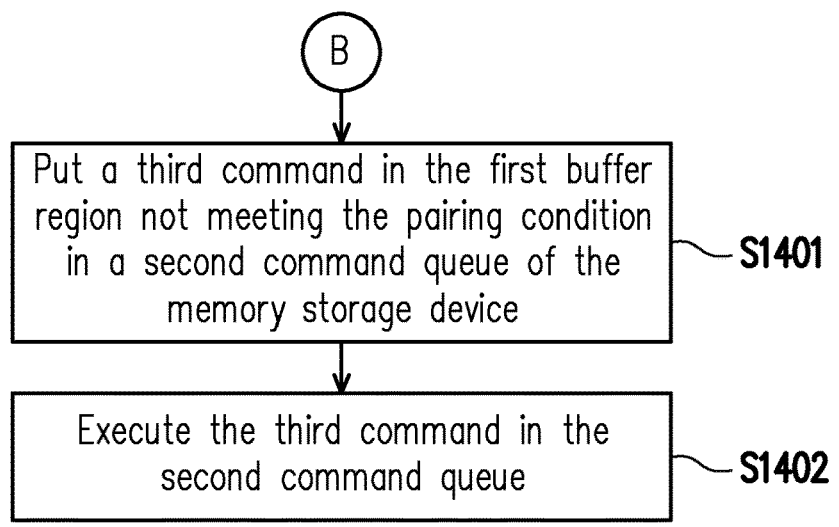
FIG. 14 is a flowchart of a command management method shown according to an exemplary embodiment of the invention.

FIG. 14 is a flowchart of a command management method shown according to an exemplary embodiment of the invention. Referring to FIG. 14, continuing from the exemplary embodiment of FIG. 12, if the determination of step S1203 is no, in step S1401, for a third command not meeting the pairing condition in the first buffer region, the third command not meeting the pairing condition in the first buffer region is put in a second command queue of the memory storage device. In step S1402, the third command in the second command queue is executed.

However, each step in FIG. 12 to FIG. 14 is as described in detail above, and is not repeated herein. It should be mentioned that, each step in FIG. 12 to FIG. 14 may be implemented as a plurality of program codes or circuits, and the invention is not limited thereto. Moreover, the method of FIG. 12 to FIG. 14 may be used with the above exemplary embodiments, and may also be used alone, and the invention is not limited thereto.

Based on the above, by putting the commands that need to be continuously executed (for example, the first command and the second command meeting the pairing condition) in a specific command queue, these commands may be ensured to be continuously executed. Moreover, by force extracting the next command from a specific command queue in the host system, the missing command in the buffer region of the memory storage device (for example, the second command meeting the pairing condition) may be directly obtained. In this way, the probability that the memory storage device does not continuously execute the specific command and causing unexpected behavior or error may be reduced, and/or the operational stability of the memory storage device may be improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A command management method, configured to a memory storage device, wherein the memory storage device is coupled to a host system, and the command management method comprises:
   obtaining a plurality of commands from a memory of the host system;
   storing the plurality of commands in a first buffer region of the memory storage device;
   putting a first command and a second command in the first buffer region in a first command queue of the memory storage device in response to the first command and the second command in the first buffer region meeting a pairing condition;
   obtaining the second command from the memory of the host system in response to a presence of the first command and an absence of the second command in the first buffer region;
   storing the second command in a second buffer region of the memory storage device;
   putting the first command in the first buffer region and the second command in the second buffer region in the first command queue; and
   continuously executing the first command and the second command in the first command queue.

2. The command management method of claim 1, wherein the first command is obtained from a specific command queue in the memory, and the step of obtaining the second command from the memory of the host system comprises:
   force reading a next command from the specific command queue in the memory to obtain the second command.

3. The command management method of claim 1, further comprising:
   configuring a plurality of command queues in the memory storage device,
   wherein the plurality of command queues comprise the first command queue and at least one second command queue.

4. The command management method of claim 3, further comprising:
   putting a third command in the first buffer region not meeting the pairing condition in the at least one second command queue; and
   executing the third command in the at least one second command queue.

5. The command management method of claim 1, further comprising:
   scanning the plurality of commands in the first buffer region to identify at least one of the first command and the second command meeting the pairing condition.

6. The command management method of claim 5, wherein the step of scanning the plurality of commands in the first buffer region comprises:
   finding the second command meeting the pairing condition from remaining commands in the first buffer region after identifying the first command meeting the pairing condition in the first buffer region.

7. A memory storage device, comprising:
   a connection interface unit configured to be coupled to a host system;
   a rewritable non-volatile memory module;
   a memory control circuit unit coupled to the connection interface unit and the rewritable non-volatile memory module,
   wherein the memory control circuit unit comprises a buffer memory, and the memory control circuit unit is configured to:
      obtain a plurality of commands from a memory of the host system;
      store the plurality of commands in a first buffer region of the buffer memory;
      put a first command and a second command in the first buffer region in a first command queue of the buffer memory in response to the first command and the second command in the first buffer region meeting a pairing condition;
      obtain the second command from the memory of the host system in response to a presence of the first command and an absence of the second command in the first buffer region;
      store the second command in a second buffer region of the buffer memory;
      put the first command in the first buffer region and the second command in the second buffer region in the first command queue; and
      continuously execute the first command and the second command in the first command queue.

8. The memory storage device of claim 7, wherein the first command is obtained from a specific command queue in the memory, and the operation of obtaining the second command from the memory of the host system comprises:
   force reading a next command from the specific command queue in the memory to obtain the second command.

9. The memory storage device of claim 7, wherein the memory control circuit unit is further configured to:
   arrange a plurality of command queues in the buffer memory,
   wherein the plurality of command queues comprise the first command queue and at least one second command queue.

10. The memory storage device of claim 9, wherein the memory control circuit unit is further configured to:
    put a third command in the first buffer region not meeting the pairing condition in the at least one second command queue; and
    execute the third command in the at least one second command queue.

11. The memory storage device of claim 7, wherein the memory control circuit unit is further configured to:
    scan the plurality of commands in the first buffer region to identify at least one of the first command and the second command meeting the pairing condition.

12. The memory storage device of claim 11, wherein the operation of scanning the plurality of commands in the first buffer region comprises:
    finding the second command meeting the pairing condition from remaining commands in the first buffer region after identifying the first command meeting the pairing condition in the first buffer region.

13. A memory control circuit unit, comprising:
a host interface configured to be coupled to a host system;
a memory interface configured to be coupled to a rewritable non-volatile memory module;
a buffer memory; and
a memory management circuit coupled to the host interface, the memory interface, and the buffer memory,
wherein the memory management circuit is configured to:
    obtain a plurality of commands from a memory of the host system;
    store the plurality of commands in a first buffer region of the buffer memory;
    put a first command and a second command in the first buffer region in a first command queue of the buffer memory in response to the first command and the second command in the first buffer region meeting a pairing condition;
    obtain the second command from the memory of the host system in response to a presence of the first command and an absence of the second command in the first buffer region;
    store the second command in a second buffer region of the buffer memory;
    put the first command in the first buffer region and the second command in the second buffer region in the first command queue; and
    continuously execute the first command and the second command in the first command queue.

14. The memory control circuit unit of claim 5, wherein the first command is obtained from a specific command queue in the memory, and the operation of obtaining the second command from the memory of the host system comprises:
    force reading a next command from the specific command queue in the memory to obtain the second command.

15. The memory control circuit unit of claim 13, wherein the memory management circuit is further configured to:
    arrange a plurality of command queues in the buffer memory,
    wherein the plurality of command queues comprise the first command queue and at least one second command queue.

16. The memory control circuit unit of claim 15, wherein the memory management circuit is further configured to:
    put a third command in the first buffer region not meeting the pairing condition in the at least one second command queue; and
    execute the third command in the at least one second command queue.

17. The memory control circuit unit of claim 13, wherein the memory management circuit is further configured to:
    scan the plurality of commands in the first buffer region to identify at least one of the first command and the second command meeting the pairing condition.

18. The memory control circuit unit of claim 17, wherein the operation of scanning the plurality of commands in the first buffer region comprises:
    finding the second command meeting the pairing condition from remaining commands in the first buffer region after identifying the first command meeting the pairing condition in the first buffer region.

* * * * *